3,485,687
POROUS HIGH SILICA GLASS
Ian D. Chapman, Peterborough, Ontario, Canada
(% Corning Glass Works, Corning, N.Y. 14830),
and Thomas H. Elmer, Peterborough, Ontario,
Canada (30 W. 4th St., Corning, N.Y. 14830)
No Drawing. Filed July 15, 1966, Ser. No. 565,372
Int. Cl. C03c 3/06, 17/22
U.S. Cl. 156—4
4 Claims

ABSTRACT OF THE DISCLOSURE

A method of enlarging the pore size of porous glass by impregnating a porous glass body with an aqueous solution of a weakly reactive fluoride containing compound, reacting the compound in situ with a mineral acid to release hydrofluoric acid at a temperature sufficient to dissolve a portion of the glass body and washing the body to remove the soluble constituents.

---

This invention relates to porous glass and more particularly it relates to enlarging the pore size of porous high silica glass bodies.

It is well known to make a porous glass body by heat treating a certain glass to cause a separation into an acid-soluble phase and an acid insoluble phase and then extracting the soluble phase. Such a procedure is set forth by H. P. Hood et al., U.S. Patent No. 2,106,744 which describes in detail a method of making a porous glass composed of over 94% silica, from an alkali borosilicate glass by thermally treating the glass to separate it into two phases one of which is composed essentially of non-siliceous constituents and extracting this soluble phase by leaching in dilute acid. This leaves a highly siliceous structure retaining its original shape and having a multiplicity of interconnecting, submicroscopic pores, which if desired may be closed to produce a non-porous transparent glass by a subsequent heat treatment. Glasses resulting from such method are known in the art by the general designation "96% silica glasses" and this general designation is used herein with that meaning. It will be understood that the term is used in the generic sense to include all glasses produced in accordance with the above-described method irrespective of the exact silica content of the ultimate glass.

Pourous bodies obtained by conventional leaching with dilute acid typically have an average pore diameter of about 40 to 50 A. In making reconstructed glasses in which the pores are subsequently closed, the pore size is unimportant; however, for certain applications it is desirable to have a larger and uniform pore diameter. Thus, highly porous glass material having a pore size of approximately 200 A. and greater has been used in column chromatography for the separation of macromolecules and it has been used in gas-solid and gas-liquid chromatography. Attempts to enlarge the pore size of porous glass made by conventional techniques through a subsequent treatment with hydrofluoric acid have been unsuccessful since the hydrofluoric acid was too vehement and tended to dissolve the siliceous material so completely that it crumbled and fell apart.

It is, therefore, an object of the present invention to provide a process for the treatment of porous glass bodies to increase the pore size and the permeability thereof.

In accordance with the present invention, we have discovered a method of enlarging the pore size of porous glass by impregnating a porous glass body with an aqueous solution of a weakly reactive fluorine containing compound, reacting the compound in situ with a mineral acid to release hydrofluoric acid at a temperature sufficient to dissolve a portion of the glass body and washing the body to remove the soluble constituents. Primarily, we have found a way of placing hydrofluoric acid at the location where it will be most effective. Thus, the hydrofluoric acid is released only after the weakly reactive compound is placed within the pores and then is free to dissolve the high silica body at the peripheral surface of the pores to enlarge the volume. This process can be used to make porous glass bodies of various dimensions and shapes such as porous particles, porous plates, porous tubes, and porous cane.

The starting material used in the present invention is essentially porous and may be prepared in accordance with the Hood patent previously mentioned. A typical material, sold commercially by the Corning Glass Works under Code 7930, has an average pore size of about 40 to 50 A. and is composed in weight percent on a dry basis of about 96% silica, 3% boric oxide, 0.2% alumina, and less than about 0.05% sodium oxide. Preferably, the starting material should be thoroughly dried which may be done by placing the material in an oven for a suitable period of time. The porous glass body is then impregnated with a solution of a weakly reactive fluorine containing compound. Impregnation should be for a time sufficient to fill all the pores and the actual time depends to some extent upon the thickness and the configuration of the body. Generally, about five minutes for a one millimeter thick piece has been found sufficient. Since the solution is actually to some extent reactive, it is desirable not to impregnate for such a long time that the appreciable glass is removed from the external surface and the size of the body becomes diminished. The temperature of impregnation should be relatively low and is preferably around room temperature. Since the rate of etching is controlled by temperature, elevated temperatures which increase the possibility of etching from the outer surface of the material should be avoided.

Generally, the weakly reactive fluorine containing compound should be very water soluble since impregnation is performed with an aqueous solution; the compound must be capable of releasing hydrofluoric acid in the presence of a mineral acid; and the products formed after reacting with the mineral acid and dissolving of the silica should be readily water soluble. Compounds which we have found particularly useful are ammonium fluorides including ammonium fluoride and ammonium bifluoride. The alkali metal fluorides including lithium fluoride, sodium fluoride, and potassium fluoride are less desirable and are considered unsuitable. On the one hand lithium fluoride is substantially insoluble in water, while on the other hand the products obtained from the sodium salt, $Na_2SiF_6$, and the potassium salt, $K_2SiF_6$, are both difficultly soluble in water. The concentration of the compound in aqueous solution depends to some extent upon the amount of enlargement desired. Typically, the solution should contain about 5 to 40% of the ammonium fluorides in solution, i,e, about 5 to 40 grams of ammonium fluorides per 100 millimeters of volume.

Activation of the compound in situ to release hydrofluoric acid is performed with dilute mineral acid. Typically, dilute nitric acid, dilute sulfuric acid, or dilute hydrochloric acid can be used in concentrations of about 0.5 to 2 N. The treatment with mineral acid is generally at elevated temperatures and for a time sufficient for the hydrofluoric acid which has been released to react substantially with the silica on the internal periphery of the porous glass material. The acid bath should be held preferably at or near its boiling point to obtain maximum speed of extraction.

After the acid treatment, the glass is washed to remove all traces of the soluble constituents which have been acted on by the acid. This is best accomplished by immersing the glass for several hours in pure running water at elevated temperatures so as to expose all sides of the article to the washing action. The removal of the soluble products leaves the silica phase as a rigid structure possessing the original shape of the article but with the pores considerably enlarged. The article may thereafter be dried and is suitable for use.

By way of further illustrating the invention and the manner in which it may be practiced, the following specific example is set forth:

A disk of porous 96% silica glass having a diameter of 5/8 inch and a thickness of 2 mm. was made according to the procedure of the aforesaid Hood et al. patent and had a composition approximately that of Code 7930 set forth above.

The disk, having a pore diameter of 40 A., was dried and was impregnated with a 10% aqueous solution of ammonium bifluoride at room temperature for one half hour until the pores had become completely filled with the solution.

Then the wet disk was immediately immersed in a 1 N nitric acid solution at a temperature of 95° C. for a period of 5 hours. The fluoride containing compound was activated in situ to release hydrofluoric acid which attacked the silica on the surface within the pores.

Finally, the disk was washed with pure water at a temperature of 95° C. for one hour to remove all the soluble products. It was found that the treated disk which still retained its original shape had a substantially enlarged pore diameter of 240 A.

We claim:

1. A method of enlarging the pore size of porous glass comprising the following steps:
   (a) impregnating a porous 96% silica glass body with a 5 to 40% aqueous solution of a compound selected from the group consisting of ammonium fluoride and ammonium bifluoride until substantially all the pores are filled with the solution,
   (b) reacting the compound in situ with a 0.5–2.0 N solution of a mineral acid selected from the group consisting of nitric acid, sulfuric acid, and hydrochloric acid to release hydrofluoric acid and dissolve a portion of the glass body from within the pores, and
   (c) washing said body to remove the soluble constituents.

2. The method of claim 1, wherein said porous glass body is a dried 96% silica glass.

3. The method of claim 2, wherein steps (b) and (c) are performed at elevated temperatures up to the boiling point of the solution.

4. A method of enlarging the pore size of porous glass bodies comprising the steps of:
   (a) impregnating a dried porous 96% silica glass disk with about a 10% aqueous solution of ammonium bifluoride at room temperature until substantially all the pores are filled with the solution,
   (b) activating the compound in situ with a dilute nitric acid solution at an elevated temperature of about 95° C. whereby hydrofluoric acid is released and dissolves a portion of the glass body from within the pores, and
   (c) washing said body with hot water to remove the soluble products.

References Cited

UNITED STATES PATENTS 2,106,744  2/1938  Hood et al. _____ 161—164 X

FOREIGN PATENTS 273,046  6/1927  Great Britain.
634,180  1/1962  Canada.

HAROLD ANSHER, Primary Examiner

J. C. GIL, Assistant Examiner

U.S. Cl. X.R.

65—31; 106—40, 122; 117—62, 156—15, 24